Figure 1:
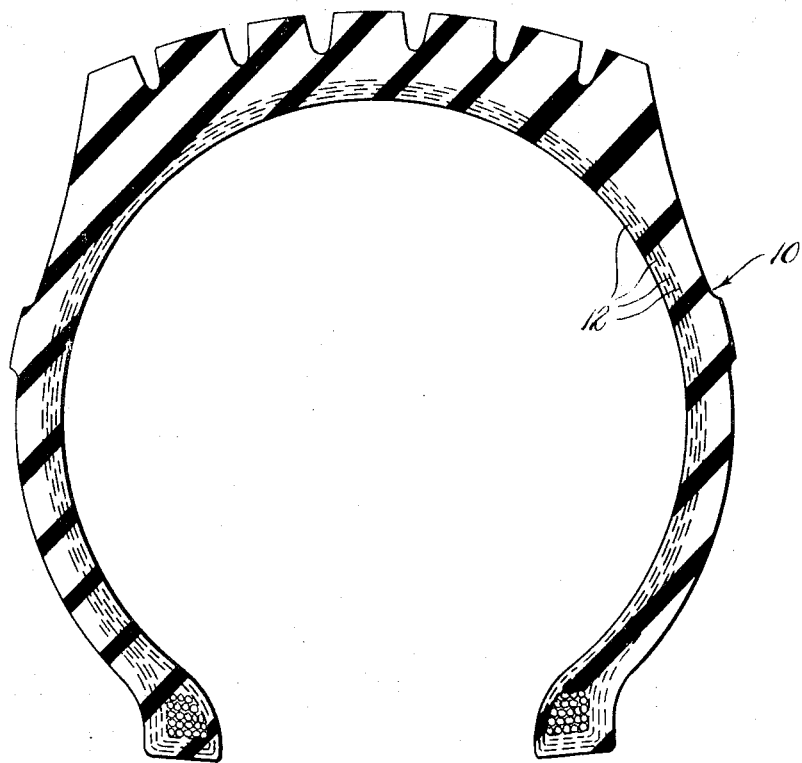

United States Patent [19]
Kibler

[11] 3,760,578
[45] Sept. 25, 1973

[54] NYLON TIRE CORDS

[75] Inventor: Richard W. Kibler, Cuyahoga Falls, Ohio

[73] Assignee: The Firestone Tire & Rubber Company, Akron, Ohio

[22] Filed: Sept. 23, 1968

[21] Appl. No.: 784,970

Related U.S. Application Data

[63] Continuation of Ser. No. 388,417, Aug. 10, 1964, abandoned.

[52] U.S. Cl.............. 57/140 C, 8/115.5, 8/115.6, 57/153, 117/7, 117/138.8 N, 152/330, 152/356, 152/359, 161/170, 161/172, 161/174, 161/175, 161/176, 260/78 R, 260/78 A, 260/78 L, 260/78 P, 260/33.4 R, 260/78 S, 260/78 SC

[51] Int. Cl........................ D02g 3/02, C08g 20/38

[58] Field of Search.................. 260/78, 78 L, 78 S, 260/78 SC, 33.4 R; 8/115.5; 117/7, 138.8 N; 152/330, 356, 359; 57/140, 153; 161/170, 172, 174, 175, 176

[56] References Cited
UNITED STATES PATENTS 3,140,957  7/1964  Tanabe et al............................ 117/6
3,388,029  6/1968  Brignac................................ 161/175

FOREIGN PATENTS OR APPLICATIONS 676,732  12/1963  Canada................................ 260/78

Primary Examiner—Harold D. Anderson
Attorney—S. M. Clark and Willard L. G. Pollard

[57]  ABSTRACT

Flatspotting of automobile tires made with nylon tire cord has significantly hampered the use of nylon tire cord for this purpose. It has been found that the introduction into a crystallized and oriented nylon tire cord of various treating agents greatly reduces the problems associated with flatspotting. The flat spot tends to run out in a very short period of time after beginning operation of a vehicle, thereby quickly eliminating the undesirable thumping or slapping sound associated with the flat spot. The treating agents contemplated for the above purpose include a number of polyhydroxy compounds of specific characteristics and/or nitrogen-containing hydroxy compounds.

18 Claims, 2 Drawing Figures

PATENTED SEP 25 1973   3,760,578

NYLON TIRE CORDS

This application is a streamlined continuation of Ser. No. 388,417 filed Aug. 10, 1964 now abandoned.

This invention relates to nylon tire cord, yarns and filaments for use in nylon tire cord, nylon cord tires, and to an improvement in the process for producing nylon tire cord.

A number of different nylon compositions have been used in the production of tire cord. The use of nylon tire cord has, however, been limited as a result of a phenomenon commonly referred to as "flatspotting." When a vehicle stands for an extended period of time, those portions of the tires which are in contact with the ground flatten. The flattened portion tends to be retained for a substantial period of time after the vehicle is placed in operation. As the tire rotates, there is a decided thumping or slapping sound resulting from the flat spot on the tire. With many tire cords, what little flat spot is formed runs out quickly. However, the properties of nylon tire cord are such that the flatspotting is retained substantially longer than with tires utilizing other tire cord materials.

In general, the tendency of an ordinary nylon tire cord to flatspotting as reflected in its "response lag" measurement described hereinbelow, is of the order of 200 to 250 mils. The usual approach to prevent flatspotting has been to increase the initial modulus (determined as described hereinbelow) of the tire cord by altering the polyamide in the tire cord, e.g., by mixing with high melting polyamides, cross-linking, grafting and/or block polymerization. In general, the modulus is increased until the response lag is reduced to 160 mils or less.

This method has been reasonably successful in minimizing flatspotting, but has not eliminated it. In fact, to the extent that any flatspotting tendency remains after this treatment, the flat spot lasts for a much longer period of time before "running out," i.e., the vehicle must be operated for a considerably longer period of time at any given speed to cause the disappearance of the flat spot.

It has now been found that a number of polyhydroxy compounds and/or nitrogen-containing hydroxy compounds can be added to nylon filament, fiber, yarn or tire cord to provide a product having improved properties which tend to minimize the problems associated with flatspotting. Unexpectedly, it has been found that additives should be introduced into the nylon structure in such a manner that the initial modulus, determined as described below, is reduced substantially from that of the untreated material, preferably to less than 75 percent of the modulus of the untreated material and, more preferably, to less than 50 percent. This is directly contrary to prior attempts to overcome the problems associated with flatspotting in which the initial modulus was increased.

Another unexpected feature of the present invention is found in the fact that the treating agents employed herein tend to affect only the initial modulus, not the modulus at higher stresses. At stress values of the order of six to eight pounds, the stress-strain curve for the treated material again becomes substantially the same as that for the untreated material. The tensile properties of the treated material are not seriously reduced by the treatment. All stress values given herein are for a cord of 2 × 840 denier yarn unless otherwise indicated. Equivalent values for materials of different denier can, of course, be determined in the usual manner.

Tire cord produced according to the present invention provides the advantage that any flat spot will tend to run out in a very short period after beginning operation of a vehicle utilizing tires containing such tire cord. Further, because of the lower initial modulus and response lag, the flat spot is more yielding on the road, thus reducing the amount of objectionable interaction between the wheel and the road. Thus, the undesirable thumping or slapping will be, at most, of vary short duration and of less objectionable character. Carried to the ultimate in this direction, the flat spot will disappear during the first revolution of the tire, and no "flatspotting" will be detected.

The treating agents which have been found to be useful for the purpose of the present invention include:

Group 1. Lower molecular weight, aliphatic polyhydroxy alcohols containing at least three hydroxyl groups per molecule;

Group 2. Dihydroxy compounds having the general formula HO-$R_1$-OH wherein $R_1$ is selected from the group consisting of:
  a. alkylene radicals containing at least three carbon atoms;
  b. substituted alkylene radicals wherein the alkylene chain contains at least three carbon atoms;
  c. alkyl substituted ethylene radicals wherein the alkyl substituent contains from one to six carbon atoms;

Group 3. Compounds containing at least one free hydroxyl group and selected from the group of compounds consisting of the lower aliphatic ethers, esters, acetals and hemiacetals of the polyhydroxy compounds of Groups 1 and 2, and of ethylene glycol; and Group 4. Nitrogen-containing hydroxy compounds having the general formula

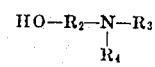

wherein $R_2$ is selected from the group consisting of lower alkylene and substituted-lower alkylene wherein the substituents are selected from the group consisting of lower alkyl, lower hydroxy alkyl and lower amino alkyl, and $R_3$ and $R_4$ are separately selected from the group consisting of hydrogen, lower alkyl, lower hydroxy alkyl, lower acyl, phenyl and lower alkyl substituted phenyl.

In addition to the foregoing treating agents, suitable mixtures of the several treating agents can be employed as well as aqueous solutions of the active treating agents. In many instances glycerine has been found to be an excellent solvent for other of the treating agents, and these glycerine solutions have been found to have exceptional properties for use in the present invention.

Specific examples of treating agents of Group 1, the polyhydroxy alcohols containing at least three hydroxyl groups, include: glycerine; 1,2,4-butanetriol; 1,2,6-hexanetriol; glycerine dimer and polymers such as the commercial mixtures designated hereinafter as polyglycerol, hydroxypropyl glycerine, 2-hydroxymethyl glycerine, trimethylolpropane, erythritol, arabitol, sorbitol, xylitol, pentaerythritol and inositol.

An example of a useful treating agent falling in Group 2(a) is trimethylene glycol.

Examples of useful treating agents falling in Group 2(b) are pyridyl-substituted trimethylene glycols, e.g., 2 (1,3-dihydroxyisopropyl) pyridine commercially known as dimethylol-alpha-picoline.

An example of a useful treating agent falling in Group 2(c) is 1,2-octylene glycol.

Examples of useful treating agents falling in Group 3 are glycerol-alpha-alkyl ethers, 5-hydroxymethyl-4, 4-dimethyl dioxane, monoacetin, glycerol-alpha-hydroxymethyl ether, diethylene glycol and dipropylene glycol.

Specific examples of useful treating agents falling within Group 4 are 1,3-diamino-2-propanol; 2-amino-2-methyl-1, 3-propanediol; 3-amino-1-propanol; diethanolamine; triethanolamine; diisopropanolamine; triisopropanolamine; N-ethyldiethanolamine; N-beta-hydroxyethyl formamide; N,N-di (Beta-hydroxyethyl) formamide; 2-anilinoethanol, (N-phenyl ethanolamine); N-phenyl diethanolamine; and 2-amino-2-methyl-1-propanol.

The present invention is particularly useful with Nylon-6. It is not, however, restricted to this nylon. Thus, the invention finds use with Nylon-6, polycaprolactam; Nylon-66, polyhexamethylene adipamide; Nylon-7, polyenantholactam; Nylon-4, polybutyrolactam; and Nylon-5, polyvalerolactam, as well as the blends of the various nylons, e.g., a blend of Nylon-6 and Nylon-6I (polyhexamethylene isophthalamide).

The nylon to be treated may be in the form of yarn, filament, fiber or tire cord. It is important, however, that the treating agent be introduced into the nylon structure subsequent to the primary crystallization and orientation of the structure, i.e., after drowning. While the treating agent may be introduced into dipped tire cord, it is preferable to treat cord prior to the final heat stabilization treatment and tire cord dipping.

The nylon structure is contacted with the treating agent while the treating agent is in liquid form. In most instances the treating agents employed in the present invention are normally liquid, i.e., liquid at room temperature. A small portion of the treating agents is normally solid, but is liquid at temperatures of treating. In a few instances it is necessary to dissolve the treating agent in a suitable solvent to effect suitable treatment in accordance with the present invention. Emulsions may also be useful in some circumstances.

A number of factors must be considered to obtain a suitable product in accordance with the present invention. It is necessary that the treatment be conducted at an elevated temperature. While this will vary depending on the particular treating agent being employed, the minimum treating temperature can be determined readily once the purpose and manner of treating is understood. In some instances, a temperature of the order of 160°–170° C. is most desirable; however, in many instances the nature of the treating agent will not permit of such temperatures and lower temperatures on the order of 100°–160° C. will be necessary consistent with the properties of the treating agent.

The duration of treatment is also quite important. While the effectiveness of the treatment depends on a time-temperature relationship, it has generally been found that reducing the treatment time to less than about nine seconds causes a drop-off in the effectiveness of the present invention. Particularly good results are obtained with treatments of at least 15 seconds. Treatments in excess of 30 seconds (and, particularly, in excess of a minute) may also be necessary to produce a corresponding improvement in properties. The optimum time for any particular treating agent will vary, depending on the value of the treating agent, the particular nylon being treated and the temperature of treatment. For some agents, the optimum will be from 15 seconds to 1 minute; for others, 1 minute to 60 minutes. No additional benefit will be obtained by prolonging the treatment beyond the optimum time for that particular set of materials and temperature.

Still another factor that must be considered for successful practice of the present invention is to maintain the structure under tension during the heat treatment. In general, the yarn, cord or fibers are maintained under a tension of 700–1400 grams. As employed herein, tension is given as the force exerted on a cord of $2 \times 840$ denier yarn. Corresponding values for materials of other denier are readily calculated in the usual manner. While under some circumstances lower or higher tensions can be tolerated, under no circumstances should the tension drop below the minimum tension requirement for each treatment material which exists between 0 and 700 grams. The minimum tension is that which is just sufficient to prevent substantial loss of fiber orientation under the conditions of treatment. Although the upper limit can approach the breaking load, in general, it should be maintained below about 2,500 grams.

The treatment is most satisfactorily effected by passing the nylon structure through a bath of the treating agent maintained at the desired treating temperature. The tension of the nylon structure in the bath can be maintained by standard tensioning means. The duration of the treatment can be controlled by the location of the rolls in the treating bath and the take-up speed of the nylon structure through the bath.

While the foregoing method is preferred, it is possible to pass the nylon structure through a bath of treating agent at room temperature and to then pass the nylon structure for the desired treating time, e.g., two-three minutes, through a suitable oven maintained at the desired temperature, e.g., 160° C.

It is clear that penetration of the treating agent into the filament or fiber making up the yarns and/or tire cords is essential. It is also important that the treating agent, once it has penetrated the nylon structure, should be retained in the structure in an effective amount under the conditions of temperature to which the treated tire cord will be subjected in subsequent tire manufacturing operations. It appears likely that the effective amount of the treating agent enters into the amorphous portion of the drawn nylon filament without appreciably affecting the crystalline portions which give the nylon its desirable tensile properties. This may be illustrated by a number of tests wherein the nylon structures were passed through baths of the treating agents in the manner described previously. The nylon structures picked up as much as thirty percent by weight of the treating agent and these were wrapped on glass spools. Only minor amounts of the treating agents were lost; however, when such treated nylon structures were wound on absorbent spools such as paper spools, a wicking action occurred wherein the amount of treating agent contained in the nylon structure was reduced to the order of about four to eight percent. The value in each instance appeared to be an irreducible minimum which was characteristic of the particular fiber and the treating agent. By "irreducible minimum" it is meant that no additional wicking occurs and the content of treating agent will stay reasonably consistent unless subjected to more stringent conditions such as heating at elevated temperatures for extended periods of time.

As will be noted in the examples, the preferred and superior treating process in accordance with the present invention comprises passing the nylon structure under a tension of 700 to 1,400 grams through a bath of the treating agent maintained at a temperature in the range of 100°–175° C. for a treating time of from about 15 to about 60 seconds. By this method, nylon tire cord can be obtained which is characterized by the presence of substantial quantities of the treating agent in the nylon structure and by an initial modulus at least 25 percent less than the modulus of the untreated nylon structure.

It has been found to be advantageous to follow the treating process with a quick wash or other treatment to remove treating agent from the surface of the nylon structure, followed by a supplemental heat treatment of the order of three minutes in duration in an air oven at a temperature of about 160°–180° C. In the examples which follow all supplemental heating was in an oven unless otherwise stated. Unexpectedly, the washed and heated yarn, cord, or fibers have been found to have enhanced crystallinity, as indicated by X-ray data, over that observed in like products wherein the same steps were followed except that the treatment with treating agent was omitted.

There has been found to be a correlation between rate of recovery from flatspotting of tires containing a particular tire cord and the response lag characteristics of the nylon fiber or yarn which makes up the tire cord. Response lag is determined by suspending a weight of three pounds from a filament, yarn or cord of 50 centimeters in length for a period of four hours. The total denier of the material so tested is from 1,680 to 2,000. At the conclusion of that period, the total length of the stretched nylon is determined. A portion of the weight, e.g., 2 pounds, is then removed and the nylon is permitted to relax under the reduced weight for a period of 16 hours. The weight is again increased to the original value and the length of the nylon material is measured after 12 seconds. The difference between the last measurement and the measurement at the conclusion of the first suspension period, measured in mils, is referred to as the response lag. It is important, of course, that the entire test be conducted at constant temperature and humidity. The usual temperature for the test is 25° C., humidity is 55 percent.

The determination of initial modulus referred to above is made on an Instron Tester with flat, rubber-faced jaws 10 inches apart with a cross-head speed of 10 inches per minute and a chart speed of 50 inches per minute. The filament is clamped in the jaws, and the machine started on the 5-pound scale. A tangent is drawn to the inked line on the chart at the 2 percent elongation location, and extended the full width of the chart. The initial modulus is calculated by the formula:

$$\text{Initial modulus (g.-den.}^{-1}) = \frac{227,000}{\text{denier} \times \text{difference in elongation as determined by the intercepts of the tangent from 0 to 5-pound load}}$$

If the treatment given a cord reduces both the response lag and the initial modulus sufficiently, a low flatspotting effect can be expected when the cord is used in tires.

In the examples, the response lag and initial modulus were determined as discussed above.

EXAMPLES A-1 through A-21

Following the treating method described above, Nylon-6 greige cord from 840 denier yarn was treated with various polyhydroxy compounds. All of the cord was washed with water or alcohol and given an air oven heat treatment after removal from the treatment bath, and prior to the measurement of the material pick-up.

The conditions of treatment and the product properties are set forth in Table A. The properties of the control, A-1, represent averages of 10 runs.

EXAMPLES B-1 through B-29

Following the process described previously, Nylon-6 greige tire cord from 840 denier yarn was treated with various polyhydroxy compounds dissolved in glycerine. The treating conditions and product test results are set forth in Table B.

TABLE A

| Run No. | Treating agent | Bath treatment Temp. (°C.) | Bath treatment Time (min.) | Suppl. heating Time (min.) | Suppl. heating Temp. (°C.) | Percent init. mat'l pickup | Response lag | Break load (lbs.) | Percent elong. | Initial modulus, g./denier |
|---|---|---|---|---|---|---|---|---|---|---|
| A-1 | Control | | | | | | 230 | 29.1 | 28.4 | 17.0 |
| A-2 | Trimethylol-propane | 125 | 1 | 3 | 160 | 21.2 | 126 | 24.7 | 22.4 | 11.3 |
| A-3 | do | 125 | 1 | 15 | 160 | 6.9 | 104 | | | |
| A-4 | Sorbitol | 150 | 5 | | | 24.7 | 151 | | | |
| A-5 | do | 175 | 5 | | | 20.0 | 129 | 29.0 | 27.7 | 14.35 |
| A-6 | do | 160 | 1 | 3 | 180 | 21.0 | 165 | | | |
| A-7 | do | 160 | 1 | 15 | 180 | 15.8 | 152 | | | |
| A-8 | Hydroxypropyl-glycerine | 160 | 1 | 3 | 180 | 7.6 | 158 | | | |
| A-9 | do | 175 | 1 | 3 | 180 | 8.1 | 158 | | | |
| A-10 | Polyglycerol | 160 | ½ | 3 | 180 | 18.1 | 141 | | | |
| A-11 | do | 160 | ½ | 15 | 180 | 11.6 | 123 | | | |
| A-12 | 1,2,6, hexane-triol | 160 | 1 | 3 | 180 | 0.9 | 114 | 17.6 | 18.6 | 10.14 |
| A-13 | Diethylene-glycol | 160 | 1 | 3 | 180 | *2.6 | 150 | | | |
| A-14 | Dipropylene glycol | 160 | 1 | 3 | 180 | 0.3 | 159 | | | |
| A-15 | Glycerol-alpha-allyl ether | 160 | 1 | 3 | 160 | 3.3 | 137 | | | |
| A-16 | Octylene glycol | 160 | 1 | 3 | 160 | 2.9 | 140 | | | |
| A-17 | Trimethylene glycol | 140 | 1 | 3 | 160 | 3.4 | 142 | | | |
| A-18 | Dimethylol-alpha-picoline | 160 | 1 | 3 | 160 | 20.8 | 132 | 19.1 | 17.8 | 13.3 |
| A-19 | do | 100 | 1 | 3 | 160 | 18.5 | 148 | | | |
| A-20 | 1,2,4, butanetriol | 160 | 1 | 3 | 160 | | 104 | | | |
| A-21 | do | 160 | 1 | 15 | 160 | | 105 | | | |

*Loss.

TABLE B

| Run No. | Treating Agent | Bath treatment Temp. (°C.) | Bath treatment Time (min.) | Suppl. heating Time (min.) | Suppl. heating Temp. (°C.) | Percent Init. mat'l pickup | Response lag (mils) | Break load (lbs.) | Percent elong. | Initial modulus, g./denier |
|---|---|---|---|---|---|---|---|---|---|---|
| B-1 | Control | | | | | | 230 | 29.1 | 28.4 | 17.0 |
| B-2 | 10% pentaerythritol, 90% glycerine | 160 | ½ | 3 | 180 | 8.3 | 118 | 26.9 | 27.8 | 10.5 |
| B-3 | do | 160 | ½ | 15 | 180 | | 129 | 25.6 | 22.4 | 16.1 |
| B-4 | 20% pentaerythritol, 80% glycerine | 160 | ½ | 3 | 180 | 9.1 | 116 | 27.9 | 29.3 | 11.3 |
| B-5 | do | 160 | ½ | 15 | 180 | | 134 | 27.5 | 26.2 | 15.2 |
| B-6 | 25% pentaerythritol, 75% glycerine | 160 | ½ | 3 | 180 | 10.4 | 118 | | | |
| B-7 | do | 160 | ½ | 15 | 180 | | 130 | | | |
| B-8 | 30% pentaerythritol, 70% glycerine | 160 | ½ | 3 | 180 | 9.5 | 121 | | | |
| B-9 | do | 160 | ½ | 15 | 180 | 1.5 | 128 | | | |
| B-10 | 35% pentaerythritol, 65% glycerine | 160 | ½ | 3 | 180 | 18.0 | 117 | 24.2 | 22.1 | 13.4 |
| B-11 | do | 160 | ½ | 15 | 180 | 1.4 | 119 | 20.0 | 18.7 | 15.9 |
| B-12 | 50% pentaerythritol, 50% glycerine | 160 | ½ | 3 | 180 | 13.8 | 117 | 25.1 | 21.6 | 12.8 |
| B-13 | do | 160 | ½ | 15 | 180 | 8.5 | 118 | 10.3 | 11.2 | 16.2 |
| B-14 | do | 160 | 1 | 3 | 180 | 25.4 | 112 | 29.5 | 29.6 | 12.25 |
| B-15 | 10% Inositol, 90% glycerine | 160 | 1 | 3 | 180 | 8.1 | 107 | | | |
| B-16 | do | 160 | 1 | 15 | 180 | | 134 | | | |
| B-17 | 20% Inositol, 80% glycerine | 160 | 1 | 3 | 180 | 9.5 | 105 | 28.9 | 26.5 | 13.1 |
| B-18 | do | 160 | 1 | 15 | 180 | 1.5 | 130 | 28.2 | 26.3 | 14.4 |
| B-19 | 50% Inositol, 50% glycerine | 160 | 1 | 3 | 180 | 17.3 | 119 | 29.5 | 27.7 | 12.6 |
| B-20 | do | 160 | 1 | 15 | 180 | 4.5 | 119 | 25.3 | 21.3 | 18.3 |
| B-21 | 10% Sorbitol, 90% glycerine | 160 | 1 | 3 | 180 | 8.6 | 108 | 26.0 | 23.8 | 11.4 |
| B-22 | do | 160 | 1 | 15 | 180 | | 132 | 28.4 | 28.1 | 13.78 |
| B-23 | 20% Sorbitol, 80% glycerine | 160 | 1 | 3 | 180 | 11.6 | 114 | 29.2 | 30.6 | 11.6 |
| B-24 | do | 160 | 1 | 15 | 180 | 0.7 | 123 | 27.0 | 25.3 | 14.6 |
| B-25 | 50% Sorbitol, 50% glycerine | 160 | 1 | 3 | 180 | 7.6 | 115 | 28.7 | 27.7 | 13.5 |
| B-26 | do | 160 | 1 | 15 | 180 | 2.3 | 124 | 29.2 | 29.2 | 15.3 |
| B-27 | 80% glycerine, 20% water | 130 | 5 | | | 16.5 | 119 | 29.0 | 28.9 | 11.35 |
| B-28 | 75% glycerine, 25% dimethylol-2-picoline | 160 | 1 | 3 | 160 | 21.1 | 106 | 30.0 | 26.7 | 13.9 |
| B-29 | do | 160 | 1 | 15 | 160 | | 114 | 18.3 | 16.7 | 14.5 |

EXAMPLES C-1 through C-3

Glycerine was tested as a treating agent under a number of different conditions and found to be an exceptional treating agent for the purposes of the present invention. The procedures followed for use of the treating agent were generally those described for the "A" series of examples. It has been found that the response lag of Nylon-6 yarn can be lowered from the range of 170–185 mils to the range of 75–90 mils by treating the yarn with hot glycerine at a temperature in the range of 150°–160° C. The time of treatments ranged from 1 minute to 1 hour. Some of these tests included supplemental heating at temperatures of from 150° to 170° C. but in many cases supplemental heating was unnecessary to obtain good response lag properties.

The response lag of undipped Nylon-6 tire cord has been reduced from 230 mils to 100–110 mils by treatments ranging from 15 seconds to 1 hour at temperatures in the range of 150°–160° C. Supplemental heat treatments ranged from none to one minute at 180° C. to one hour at 150°–170° C. By similar treatments, the response lag of dipped cord was reduced from 184 mils to 89–125 mils.

In a number of tests the tension on the tire cord during treatment was varied from 0 to 1,450 grams. While improvement was noted at the higher tensions, there was a decided superiority when the tension was maintained in the range of 700–1,000 grams.

If the treatment is conducted at much above about 160° C. tensile properties of the product are injured; however, treatment for about 15 seconds at about 160° C. was found to provide excellent results and continued treatment beyond 15 seconds provided no substantial advantage. Typical examples of the treatments described above will be found in Table C. For these examples Nylon-6 tire cord from 2 × 840 denier yarn was treated for 30 seconds in a glycerine bath maintained at 160° C. with the cord under an initial tension of 700 grams. Following treatment, they were washed with water and heated in an air oven at 180° C. for the time indicated in the Table. The control for these tests will be found in Example A-1 of Table A.

TABLE C

| Run No. | Suppl. heating time (min.) | Percent initial mat'l pickup | Response lag (mils) | Break load (lbs.) | Percent elong. | Initial modulus, g./denier |
|---|---|---|---|---|---|---|
| C-1 | 1 | 12.6 | 108 | 28.0 | 29.6 | 11.55 |
| C-2 | 2 | 9.3 | 104 | 24.6 | 25.1 | 11.60 |
| C-3 | 3 | 7.2 | 103 | 27.4 | 29.3 | 11.0 |

EXAMPLES D-1 through D-4

The method of the present invention has been found to be useful with a number of different nylon materials. These materials were treated in the manner described previously. The conditions of testing and the response lag of the products will be found in Table D. For these tests nylon cord from 2 × 840 denier yarn under 700 grams tension was subjected to the indicated treatments.

EXAMPLES E-1 through E-12

Aqueous treating agents were also found to be useful in the present invention. Following the previously-described procedures, Nylon-6 tire cord was treated with aqueous solutions of the treating agents. It was found that best results were obtained at the higher concentrations. The treatment conditions and product test results are provided in Table E.

TABLE D.—EFFECT OF GLYCERINE TREATMENT ON OTHER NYLON POLYMERS

| Run No. | | Glycerine bath | | Supplemental heat air oven | | Response lag (mils) |
|---|---|---|---|---|---|---|
| | | Time, sec. | Temp., °C. | Time, min. | Temp., °C. | |
| D-1 | Nylon 6: Control | | | | | 323 |
| | Treated | 30 | 160 | 3 | 180 | 103 |
| D-2 | Nylon 66: Control | | | | | 236 |
| | Treated | 30 | 160 | 3 | 180 | 147 |
| D-3* | 85/15 Nylon 6 Nylon 6I: Control | | | | | 200 |
| | Treated | 30 | 160 | 3 | 180 | 148 |
| D-4* | 80/20 Nylon 6 Nylon 6I: Control | | | | | 184 |
| | Treated | (a) | 160 | 3 | 160 | 134 | a 1 minute.
*Polymer blend of Nylon 6 and Nylon 6I in the specified ratio.

TABLE E

| Run No. | Treating Agent | Bath treatment | | Suppl. heating | | Percent init. mat'l pickup | Response lag (mils) | Break load (lbs.) | Percent elong. | Initial modulus, g./denier |
|---|---|---|---|---|---|---|---|---|---|---|
| | | Temp. (°C.) | Time (min.) | Time (min.) | Temp. (°C.) | | | | | |
| E-1 | 25% glycerine, 75 percent water | 25 | 1 | 1 | 180 | 1.3 | 169 | | | |
| E-2 | 50% glycerine, 50% water | 25 | 1 | 1 | 180 | 2.8 | 144 | | | |
| E-3 | 80% glycerine, 20% water | 25 | 1 | 1 | 180 | 9.0 | 148 | 28.0 | 27.3 | 12.2 |
| E-4 | do | 25 | 1 | 2 | 180 | 3.7 | 133 | 28.6 | 28.1 | 12.1 |
| E-5 | do | 25 | 1 | 3 | 180 | 5.4 | 129 | 29.3 | 28.6 | 12.4 |
| E-6 | do | 130 | 5 | | | 16.5 | 119 | 29.0 | 28.9 | 11.35 |
| E-7 | 40% aqueous dimethylol-alpha-picoline | 90 | 1 | 3 | 180 | 2.1 | 130 | 29.7 | 27.0 | 13.0 |
| E-8 | 60% aqueous dimethylol-alpha-picoline | 105 | 1 | 3 | 160 | 13.1 | 119 | 30.3 | 28.4 | 12.0 |
| E-9 | 80% aqueous dimethylol-alpha-picoline | 110 | 1 | 3 | 160 | 18.2 | 113 | 27.8 | 26.2 | 10.4 |
| E-10 | 90% aqueous dimethylol-alpha-picoline | 110 | 1 | 3 | 160 | 16.8 | 123 | | | |
| E-11 | 80% aqueous di-isopropanolamine | 110 | 1 | 3 | 160 | 6.1 | 138 | | | |
| E-12 | 80% aqueous tri-ethanolamine | 110 | 1 | 3 | 160 | 12.9 | 133 | | | |

EXAMPLES F-1 through F-22

In accordance with the previously described procedures, Nylon-6 tire cord from 2 × 840 denier yarn was treated with a number of nitrogen-containing hydroxy compounds. The treating conditions and product test results are shown in Table F. With the exception of the cords treated with anilinoethanol (N-phenyl ethanolamine), all of the treated cords were water washed. The anilinoethanol-treated cords were washed with ethanol. As will be noted from the data of Table F, particularly exceptional results were obtained with glycerine-anilinoethanol mixtures.

While the response lag test is a good indication of the flatspotting characteristics to be expected from any particular nylon yarn, filament or tire cord, tires were prepared using tire cord of the present invention and the tires were tested for flatspotting. The tests bore out the showings of the response lag tests that the products of the present invention did minimize flatspotting problems. In the test employed on the tires, a tire mounted on an automobile is placed in contact with a rotating drum. The drum, in turn, causes the tire to rotate. In this manner the tire is caused to rotate for 15 minutes at a rate corresponding to 80 miles per hour. The car is then removed from contact on the drum and allowed to sit for 17 hours. The car is then raised and the tire placed in contact with the rotating drum which causes the tire to rotate at a rate corresponding to 30 miles per hour. The presence of a flat spot on the tire will cause the wheel axle to undergo an acceleration when the flat spot contacts and ceases contact with the drum, along a line passing through the axle and through the point of contact between the drum and the tire. This acceleration of the axle is measured after 1-half minute and after 5 minutes of rotation at a rate corresponding to 30 miles per hour. This is the test that was employed to test the tires of Examples G-1 through G-6.

TABLE F

| Run No. | Treating Agent | Bath treatment | | Suppl. heating | | Percent init. mat'l pickup | Response lag (mils) | Break load (lbs.) | Percent elong. | Initial modulus, g./denier |
|---|---|---|---|---|---|---|---|---|---|---|
| | | Temp. (°C.) | Time (min.) | Time (min.) | Temp. (°C.) | | | | | |
| F-1 | Control | | | | | | 230 | 29.1 | 28.4 | 17.0 |
| F-2 | 100% anilinoethanol | 100 | 1 | 3 | 160 | 7.3 | 116 | 29.2 | 28.9 | 9.3 |
| F-3 | do | 115 | 1 | 3 | 160 | 13.1 | 91 | 27.4 | 28.2 | 8.3 |
| F-4 | do | 120 | 1 | 3 | 160 | 9.4 | 104 | 26.5 | 25.1 | 8.7 |
| F-5 | do | 140 | 1 | 3 | 160 | 18.7 | 91 | 12.7 | 15.4 | 8.7 |
| F-6 | do | 115 | 1 | 15 | 160 | 0.1 | 140 | 28.7 | 25.7 | 15.9 |
| F-7 | 2-amino-2-methyl-1-propanol | 140 | 1 | 3 | 180 | 0.7 | 185 | | | |
| F-8 | 2-amino-2-methyl-1,3-propane diol | 160 | 1 | 3 | 160 | 8.1 | 135 | | | |
| F-9 | 1,3-diaminopropanol | 160 | 1 | 3 | 160 | 7.4 | 139 | | | |
| F-10 | 3-amino-1-propanol | 160 | 1 | 3 | 160 | 0.9 | 168 | | | |
| F-11 | 50/50 anilinoethanol/glycerine | 140 | 1 | 3 | 160 | 39.9 | 86 | 5.5 | | 6.9 |
| F-12 | do | 130 | 1 | 3 | 160 | 25.1 | 89 | 16.9 | 18.8 | 8.1 |
| F-13 | 30/70 anilinoethanol/glycerine | 130 | 1 | 3 | 160 | 22.8 | 98 | 26.9 | 28.6 | 8.25 |
| F-14 | 20/80 anilinoethanol/glycerine | 130 | 1 | 3 | 160 | 12.7 | 97 | 27.9 | 25.7 | 10.85 |
| F-15 | 10/90 anilinoethanol/glycerine | 130 | 1 | 3 | 160 | 16.9 | 93 | 27.8 | 27.7 | 9.25 |
| F-16 | Diisopropanolamine | 170 | 1 | 3 | 160 | 2.0 | 112 | 28.1 | 24.0 | 16.15 |
| F-17 | do | 160 | 1 | 3 | 180 | 3.9 | 127 | 29.9 | 26.8 | 13.6 |
| F-18 | Triisopropanolamine | 160 | 1 | 3 | 160 | 9.0 | 162 | | | |
| F-19 | Diethanolamine | 160 | 1 | 3 | 180 | 5.3 | 129 | | | |
| F-20 | Triethanolamine | 160 | 1 | 3 | 160 | 16.3 | 123 | 26.0 | 22.3 | 13.5 |
| F-21 | do | 160 | 1 | 15 | 160 | 1.1 | 123 | 27.2 | 23.7 | 15.15 |
| F-22 | N-ethyldiethanolamine | 160 | 1 | 3 | 160 | 3.0 | 145 | | | |
| F-23* | N-beta-hydroxyethyl formamide | 160 | 1 | 3 | 160 | | 96 | | | |
| F-24* | do | 160 | 1 | 15 | 160 | | 135 | | | |
| F-25* | N,N-di-(beta-hydroxyethyl) formamide | 160 | 1 | 3 | 160 | | 126 | | | |
| F-26* | do | 160 | 1 | 15 | 160 | | 106 | | | |

*Response lag of untreated control—239 mils.

EXAMPLES G-1 through G-6

Nylon reinforced tires were prepared using Nylon-6 and 80/20 Nylon-6/Nylon-6I tire cords. The cords were treated with either glycerine or with a 50/50 glycerine-sorbitol mixture. Tires produced using this cord were tested in the manner described previously. The results of these tests are shown in Table G. In the table the axle acceleration is given in chart units; 7.5 chart units indicate an acceleration of 1 gram.

TABLE G

| Run No. | Nylon | Treating agent | Vertical axle acceleration | | | Response lag (mils) | Initial modulus, g./denier |
|---|---|---|---|---|---|---|---|
| | | | Initial | 3-min. | 5-min. | | |
| G-1 | Nylon-6 | Control | 32.5 | 18 | 13.5 | *160 | *24 |
| G-2 | 80/20 Nylon-6/Nylon 6I | do | 41 | 32 | 27 | | |
| G-3 | Nylon-6 | Glycerine/sorbitol | 29 | 13 | 9 | 114 | 18.3 |
| G-4 | do | do | 24 | 14 | 10 | 111 | 14.7 |
| G-5 | do | Glycerine | 19 | 11 | 9 | 91 | 14.4 |
| G-6 | 80/20 Nylon-6/Nylon 6I | Glycerine/sorbitol | | 28 | 20 | 144 | 26.3 |

*Typical values for dipped Nylon-6 cords.

Figure 2:
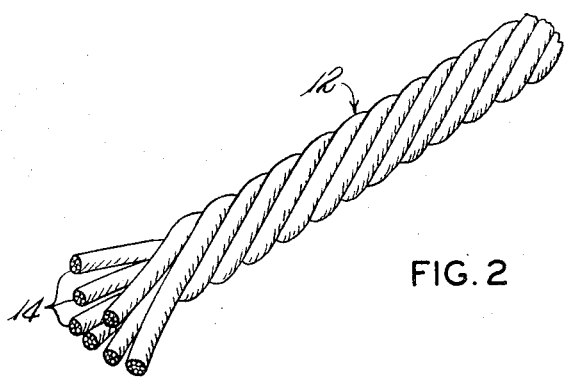

The invention is illustrated on the accompanying drawing, wherein:

FIG. 1 is a sectional view of a pneumatic tire in accordance with this invention, and FIG. 2 is a fragmentary perspective view of a tire cord in accordance with this invention.

In the drawing, there is shown a four-ply pneumatic tire 10 having embedded therein reinforcing cords 12 in accordance with this invention. An isolated cord 12 of the composition disclosed herein is shown in FIG. 2 as comprising a plurality of individual filaments 14 plied and twisted together to form the cord 12. It will be recognized that the present invention encompasses the improvements in tires having as the primary reinforcement, tire cord of the improved type previously described.

I claim:

1. A process for the treatment of drawn polycarbonamide tire cord structures which comprises treating the structures after drawing, at 100° to 170° C. for 15 seconds to 1 minute, while under tension sufficient to prevent substantial loss of fiber orientation during treatment, with a liquid treating agent selected from the class consisting of:
   A. Lower molecular weight, aliphatic polyhydroxy alcohols containing at least three hydroxyl groups per molecule;
   B. Dihydroxy compounds selected from the group consisting of methylene glycol, 2(1,3-dihydroxyisopropyl) pyridine and 1,2-octylene glycol;
   C. Compounds containing at least one free hydroxyl group and selected from the group of compounds consisting of glycerol-alpha-alkyl ethers, 5-hydroxymethyl-4,4-dimethyl dioxane, monoacetin, glycerol-alpha-hydroxymethyl ether, diethylene glycol and dipropylene glycol; and
   D. Nitrogen-containing hydroxy compounds selected from the group consisting of 1,3-diamino-2-propanol; 2-amino-2-methyl-1,3-propanediol; 3-amino-1-propanol; diethanolamine; triethanolamine, diiso-propanolamine; triisopropanolamine; N-ethyldi-ethanolamine; N-beta-hydroxyethyl formamide; N,N-di(beta-hydroxyethyl)formamide; 2-anilinoethanol, (N-phenyl ethanolamine); N-phenyl diethanolamine; and 2-amino-2-methyl-1-propanol, and thereby producing structures having an initial modulus and response lag which are substantially less than those of the respective structures before said treatment.

2. The process of claim 1 in which the temperature of treatment is 160° to 170° C.

3. The process of claim 1 in which the structures are washed after treatment to remove excess treating agent from the surface thereof.

4. The process of claim 3 in which the structures are subsequently heated at 160° to 180° C. for substantially 3 minutes.

5. The process of claim 1 in which cord is treated in glycerine at 160° to 170° C. and the treated cord is subsequently washed with water and heated at substantially 180° C.

6. The process of claim 1 in which the treating agent is a dihydroxy compound selected from the group consisting of methylene glycol, 2(1,3-dihydroxyisopropyl) pyridine and 1,2-octylene glycol.

7. The process of claim 1, in which the treating compound contains at least one free hydroxyl group and is selected from the group of compounds consisting of glycerol-alpha-alkyl ethers, 5-hydroxymethyl-4,4-dimethyl dioxane, monoacetin, glycerol-alpha-hydroxymethyl ether, diethylene glycol and dipropylene glycol.

8. The process of claim 1, in which the treating compound is selected from the group consisting of 1,3-diamino-2-propanol; 2-amino-2-methyl-1,3-propanediol; 3-amino-1-propanol; diethanolamine; triethanolamine; diisopropanolamine; triisopropanolamine; N-ethyldiethanolamine; N-beta-hydroxyethyl formamide; N,N-di(beta-hydroxyethyl) formamide; 2-anilinoethanol, (N-phenyl ethanolamine); N-phenyl diethanolamine; and 2-amino-2-methyl-1-propanol.

9. Polycarbonamide tire cords which comprise a crystalline portion in an amorphous portion and a treating agent in the amorphous portion without any substantial amount of treating agent in the crystalline portion, which treating agent is of the class consisting of:
   A. lower molecular weight, aliphatic polyhydroxy alcohols containing at least three hydroxyl groups per molecule;
   B. dihydroxy compounds selected from the group consisting of methylene glycol, 2(1,3-dihydroxyisopropyl)pyridine and 1,2-octylene glycol;
   C. compounds containing at least one free hydroxyl group and selected from the group of compounds consisting of glycerol-alpha-alkyl ethers, 5-hydroxymethyl-4,4-dimethyl dioxane, monoacetin, glycerol-alpha-hydroxymethyl ether, diethylene glycol and dipropylene glycol; and
   D. nitrogen-containing hydroxy compounds selected from the group consisting of 1,3-diamino-2-propanol; 2-amino-2-methyl-1,3-propanediol; 3-amino-1-propanol; diethanolamine; triethanolamine; diisopropanolamine; triisopropanolamine; N-ethyldiethanolamine; N-beta-hydroxyethyl formamide; N,N-di(beta-hydroxyethyl)formamide; 2-anilinoethanol, (N-phenyl ethanolamine); N-phenyl diethanolamine; and 2-amino-2-methyl-1-propanol, which crystalline portion gives the cords their tensile strength, which cords have a substantially lower response lag and initial modulus than such cords which contain none of said treating agent.

10. The cords of claim 9 in which the treating agent is a lower molecular weight, aliphatic polyhydroxy alcohol containing at least three hydroxyl groups per molecule.

11. The cords of claim 9 in which the treating agent is a dihydroxy compound selected from the group consisting of methylene glycol, 2(1,3-dihydroxyisopropyl)-pyridine and 1,2-octylene glycol.

12. The cords of claim 9 in which the treating agent is a compound containing at least one free hydroxyl group and is selected from the group of glycerol-alpha-alkyl ethers, 5-hydroxymethyl-4,4-dimethyl dioxane, monoacetin, glycerol-alpha-hydroxymethyl ether, diethylene glycol and dipropylene glycol.

13. The cords of claim 9 in which the treating agent is a nitrogen-containing hydroxy compound selected from the group consisting of 1,3-diamino-2-propanol; 2-amino-2-methyl-1,3-propanediol; 3-amino-1-propanol; diethanolamine; triethanolamine; diisopropanolamine; triisopropanolamine; N-ethyldiethanolamine; N-beta-hydroxyethyl formamide; N,N-di(beta-hydroxyethyl)formamide; 2-anilinoethanol,(N-phenyl ethanolamine); N-phenyl diethanolamine; and 2-amino-2-methyl-1-propanol.

14. A tire cord in accordance with claim 9, wherein said polycarbon amide is polycaprolactam.

15. A polycarbonamide tire cord having a total denier and having penetrated into the yarns which make up the cord, an aliphatic organic, hydroxylated plasticizer, and in an amount sufficient to decrease the cord modulus of the cord to less than 75 per cent of the untreated material.

16. The polycarbonamide tire cord as set forth in claim 15 wherein the polycarbonamide is polyhexamethylene adipamide.

17. The polycarbonamide tire cord as set forth in claim 16, wherein the organic hydroxylated plasticizer is trimethylene glycol.

18. The polycarbonamide tire cord as set forth in claim 16 wherein the organic hydroxylated plasticizer is glycerol.

* * * * *

PO-1050
(5/69)

UNITED STATES PATENT OFFICE
CERTIFICATE OF CORRECTION

Patent No. 3,760,578                Dated September 25, 1973

Inventor(s)        Richard W. Kibler

It is certified that error appears in the above-identified patent and that said Letters Patent are hereby corrected as shown below:

Col. 2, line 11
  "vary" should be -- very --

Col. 3, line 33
  "drowning" should be -- drawing --

Col. 4, line 57
  "treat-ing" should be -- treating --

Col. 5, line 25
  "air" should be inserted before the word "oven"

Col. 9, Table D, Run No. D-1, In the column headed "Response lag (mils)"
    "323" should be -- 232 --

Col. 9, Table E, Run No. E-8, in the column headed "Treating Agent"
    "dimethyllol" should be -- dimethylol --

Col. 10, line 45
  "1-half minute" should be -- 1/2 minute --

Col. 11, Claim 1, line 63, Paragraph D
  "N-ethyldi-ethanolamine" should be
    -- N-ethyldiethanolamine --

Claim 15, column 14, line 2
  after the word "denier" the words -- of 1680 to 2000 -- should be inserted Signed and Sealed this twenty-seventh Day of April 1976

[SEAL]

Attest:

RUTH C. MASON
Attesting Officer

C. MARSHALL DANN
Commissioner of Patents and Trademarks